March 23, 1971     W. A. BOOTHE ETAL     3,572,123
FLUIDIC TEMPERATURE SENSING SYSTEMS
Filed Jan. 2, 1968     2 Sheets-Sheet 1
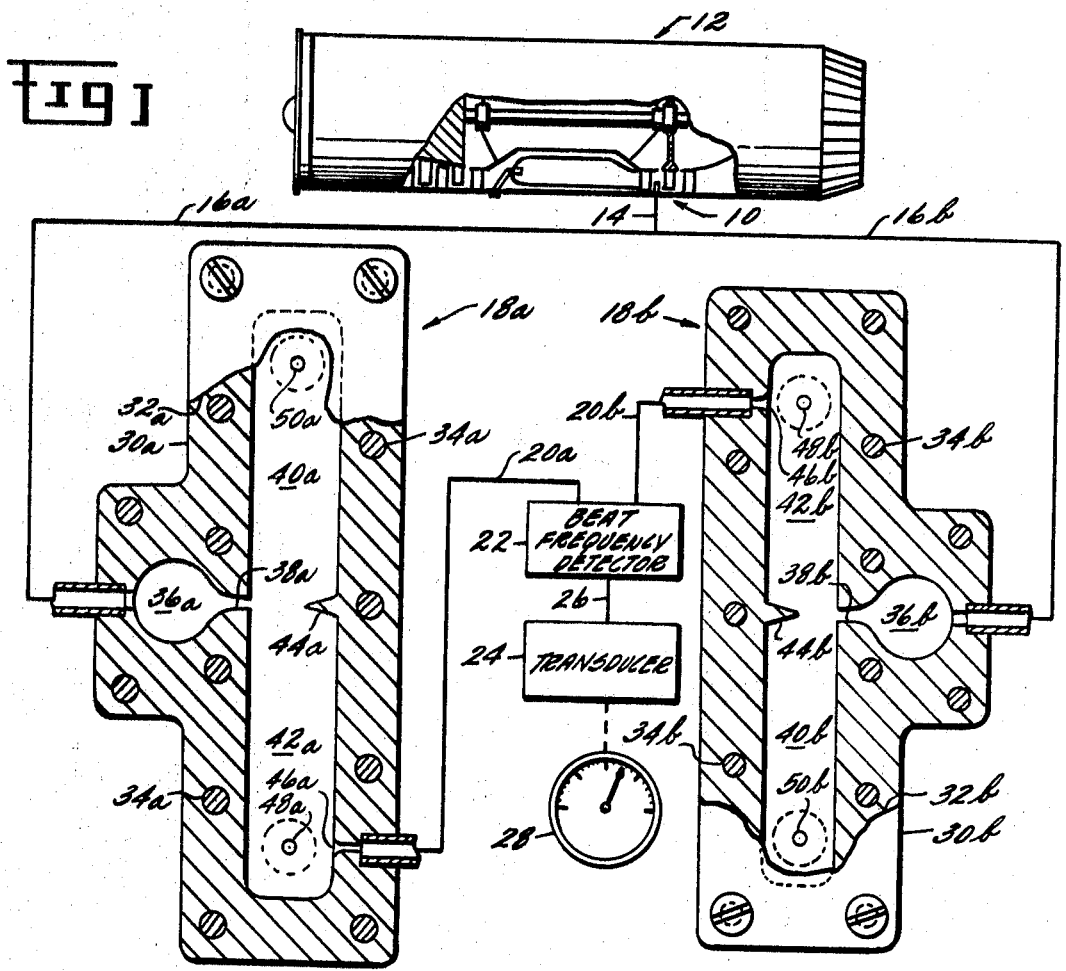
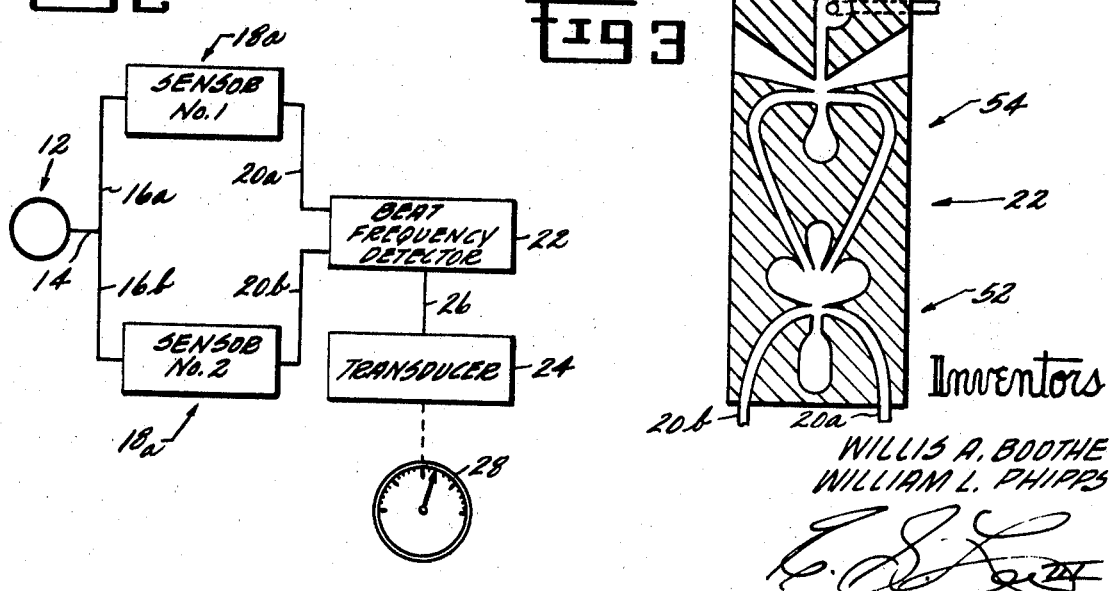
Inventors
WILLIS A. BOOTHE
WILLIAM L. PHIPPS
ATTORNEY

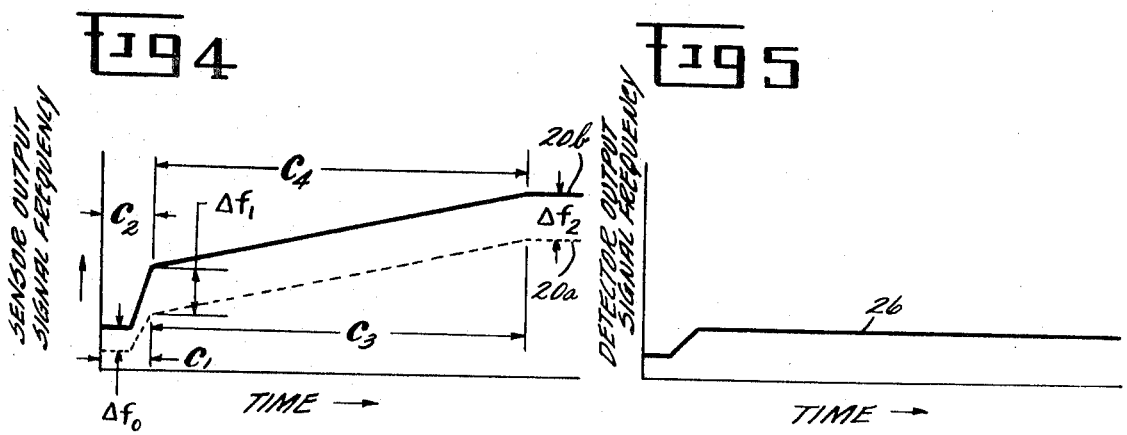
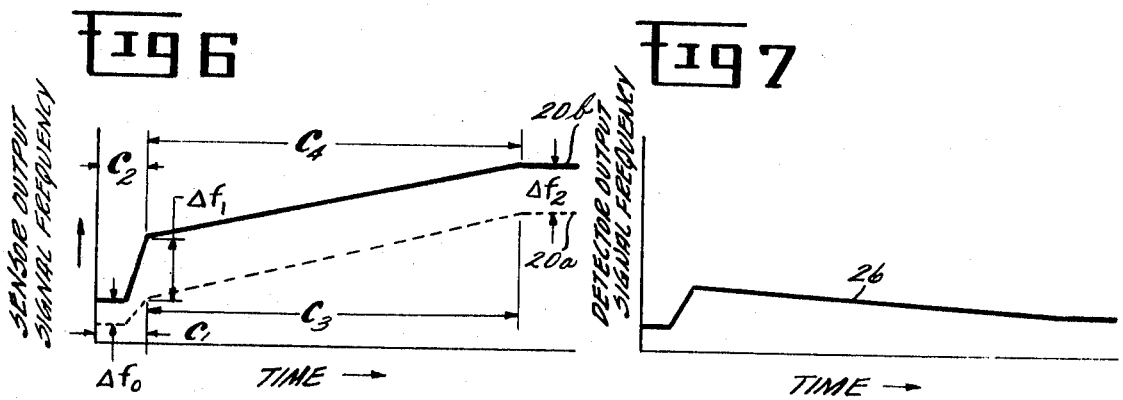

United States Patent Office 3,572,123
Patented Mar. 23, 1971

3,572,123
FLUIDIC TEMPERATURE SENSING SYSTEMS
Willis A. Boothe, Scotia, N.Y., and William L. Phipps, Cincinnati, Ohio, assignors to General Electric Company
Filed Jan. 2, 1968, Ser. No. 695,277
Int. Cl. G01k 3/00
U.S. Cl. 73—339
7 Claims

ABSTRACT OF THE DISCLOSURE

The disclosure shows a fluidic temperature sensing system which comprises two fluidic temperature sensors connected to a common fluid source. Flow of fluid through the sensors provides output signals having pressure variations, the frequency of which is proportionate to fluid temperature. When there is a step change in temperature, the difference in frequency between the two signals, at the end of their short term time constants, accurately reflects the actual change in fluid temperature before either sensor has reached a steady state condition, reflecting the temperature change. Also the rates of changes of the sensors during their short and long term time constants may be set to generate a temperature function signal and provide a leading relationship in which the frequency difference at the expiration of the short term time constants is greater than at the new steady state conditions. A fluidic beat detector provides an output signal proportionate to the difference in frequency of the two sensor signals. This output signal is employed to provide an analogue readout having a minimum response time.

---

The present invention relates to improvements in fluidic temperature sensing systems.

In recent years there has been a rapid expansion in the development of fluidic devices which are responsive to fluid pressure signals and/or generate fluid pressure signals to carry out both simple and complex control functions. Fluidic devices offer many attractions. For example, they are generally reliable because of the lack of moving parts. Also, they are capable of operation under environmental conditions, such as extreme temperatures, which make the use of electronic controls impractical, if not impossible.

One desirable utilization of fluid devices is in sensing the temperature to obtain an analogue reading or to generate a control signal, as in a gas turbine engine where it is desired to limit fuel flow when the hot gas stream temperature exceeds a given value. Several proposals have been made which do, in fact, provide a signal having pressure variations, the frequency of which is a function of temperature. Utilization of such sensors has been limited by two factors, viz, lack of a sufficiently broad range of accuracy and undue lags between changes in fluid temperature and a corresponding change in the sensor signal.

One proposal, disclosed and claimed in copending application Ser. No. 562,450, filed June 30, 1966 and of common assignment, has been highly effective in broadening the range of accuracy of frequency type fluidic temperature sensors. However, the improved characteristics of this sensor are not compatible to conventional techniques for minimizing response times to temperature changes. Accordingly, one object of the present invention is to further increase the utility of such advanced sensors by minimizing the time required for deriving a meaningful output signal therefrom.

In its broader aspects the object of the invention is to obtain accurate output signals from fluidic temperature sensing systems in a minimum of time and, more particularly, to generate temperature function output signals which are unavailable from a single fluidic sensor element.

The above stated objects may be fulfilled by providing a pair of fluidic temperature sensor means, each producing an output signal proportional to the temperature being sensed. The response time of each of the sensor means to a step change in temperature is characterized by a short term and a long term time constant. At the end of the short term time constants here is a difference in the amount of change that has occurred in the signals of the two sensor means. Then, during the much longer period of the long term time constant, the output signals continue to change until a point of stability is reached in which the values of each sensor accurately reflect, at different values, the temperature being measured.

The difference in values of the output signals of the two sensor means at the end of the short term time constants has a predetermined relationship with the steady state difference in values of the sensor output signals at the end of the long term time constants. By deriving an output signal reflecting the difference between the two sensor signals, a useful temperature function signal output is provide in a minimum time. Where the signal difference is the same at the end of the short term time constants as at the end of the long term time constants, an accurate temperature signal is obtained in a much shorter time than either sensor is capable of providing individually Where the short term time constant difference is greater, an output function having a leading relationship is provided. Other output functions may also be generated if desired.

The subject matter which we regard as our invention is particularly pointed out and distinctly claimed in the concluding portion of this specification.

Our invention, however, together with further objects and advantage thereof may best be understood by reference to the following description taken in connection with the accompanying drawings in which:

FIG. 1 is a view, with portions broken away, of a pair of fluidic temperature sensors and a gas turbine engine with a diagrammatic representation of a temperature sensing system embodying the subject invention;

FIG. 2 is a purely diagrammatic representation of a temperature sensing system embodying the subject invention;

FIG. 3 is a top view of one type of fluidic heat detector which may be used in practicing the subject invention;

FIG. 4 is a plot of frequency versus time for the output signals of the fluidic temperature sensors in accordance one aspect of the invention;

FIG. 5 is a plot of frequency versus time for the difference signal from the signals illustrated in FIG. 4;

FIG. 6 is a plot of frequency versus time for the output signals of the fluidic temperature sensors in accordance with a second aspect of the invention; and FIG. 7 is a plot of the difference frequency versus time for the signals illustrated in FIG. 6.

In FIG. 1 the preferred embodiment of a temperature sensing system in accordance with the subject invention is shown. A fluidic temperature sensing system is especially useful in sensing high temperatures of a fluid stream. A particular example where such system may be effectively employed is in obtaining an analogue reading of the temperature of the hot gas stream as it enters the turbine 10 of a gas turbine engine 12. The temperature of the gas stream at this point is extremely high and in many instances a controlling parameter in the operation of the engine.

A portion of the gas stream through the area adjacent the first stage of turbine rotor blades is diverted by a tube 14 which divides into two branch tubes 16a, 16b to provide inputs to a pair of fluidic temperature sensors 18a, 18b. The output pressure signal derived from each sensor 18a, 18b is fed via tubes 20a, 20b respectively to a differential summing device in the form of a beat frequency detector 22. The output pressure signal from the beat frequency detector 22 is then fed to a fluidic/ mechanical transducer 24 via a tube 26. The mechanical output of the transducer 24 may then be connected to a dial gauge 28 to provide an analogue output indicating the temperature of the hot gas stream in the engine 12.

A function-flow representation of a temperature sensing system in accordance with the subject invention is shown in FIG. 2, and is particularly applicable to the structure of FIG. 1.

Each of the sensors 18a, 18b is similar in construction and operation to one another and has the same reference characters referenced in the drawing by subscripts $a$ and $b$ respectively. Each sensor is basically comprised of a body member 30 having a cap 32 which may be secured to the respective body member 30 by means such as screws 34. Each of the input tubes 16a, 16b is connected to an input chamber 36. Each chamber 36 has a nozzle 38 which directs a fluid jet towards an aligned, symmetrical V-shaped protrusion 44. Chambers 40, 42 are disposed on opposite sides of this protrusion. Impingement of the fluid jet from the nozzle 38 onto the protrusion 44 creates an inherently unstable condition. This results in the jet being deflected first toward one of the cavities 40 or 42, until a sufficient pressure is built up to deflect the jet into the other cavity 42. The cavities 40, 42 of each sensor preferably have the same dimensions relative to each other and to the nozzle 38. The pressure variations thus generated provide pressure signals which are transmitted through outlet orifices 46 and the respective tube 20a, 20b. The frequency of each signal is substantially linearly proportional to the square root of the absolute temperature of the gas stream diverted from the engine 12.

For any given temperature, the output signals of the sensors 18a, 18b are different, as can be established by employing chambers 40, 42 of different lengths for the two sensors. Further, in order to maintain the linear relationship between signal frequency and square root of temperature over a wide range of inlet pressures, it is preferred that fluid flow through the sensors be controlled in accordance with the teachings of the above-referenced patent application, which can be referred to for greater detail regarding the present sensors. Specifically, the area of the nozzle 38 should be twice the venting area provided by a signal outlet orifice 46 and orifices 48, 50.

The output pressure signals of the sensors are ducted through tubes 20a, 20b, respectively, to the beat frequency detector 22 to provide a means for detecting the difference in frequencies of the sensor output signals. The beat frequency detector is shown in greater detail, in FIG. 3 and basically consists of a fluidic proportional amplifier 52 in series with a fluidic rectifier 54. This beat frequency detector produces a sinusoidal output signal, from the rectifier, having a frequency equal to the difference between the frequencies of the two sinusoidal inputs.

The beat frequency detector output signal is ducted via the tube 26 to the transducer 24 which changes the pressure signals into a mechanical signal which can be fed to dial indicator 28, suitably calibrated to provide a direct indiaction of temperature.

To best understand how a desired response to a temperature change is obtained by the sensing system of the subject invention, reference should be made to the plots shown in FIGS. 4 and 5 which illustrate the effects of a step increase in the temperature of the hot gas stream entering the sensors 18a, 18b. FIG. 4 illustrates that the output signal frequency (at conduits 20a, 20b) increases at a relatively fast rate during a relatively short time and then increases at a slower rate over a longer period of time until both sensors reach a stable condition in which their signal frequencies both accurately reflect the square root of the fluid flowing therethrough.

The time required for the initial, relatively large rate of change in frequency is referred to as the short term time constant (designated $C_1$ and $C_2$ for the outputs 20a, 20b). The time required for the second, relative low rate of change in frequency is referred to as the long term time constant (designated $C_3$ and $C_4$ for outputs 20a, 20b).

It will further be pointed out that for any step change in temperature there will be a given change in the output signal frequency at the expiration of the long term constant. Of the total change, there will be a fixed percentage occurring within the duration of the short term time constant which is a characteristic of a given sensor configuration.

FIG. 4 illustrates that the difference in frequency ($\Delta f_1$) between the signals 20a and 20b, at the end of the short term time constants, is greater than their initial difference ($\Delta f_0$) and the same as the difference ($\Delta f_2$) at the expiration of their long term time constants. This is further illustrated in FIG. 5 which is a plot of the beat detector output signal frequency (26) representing the difference signals 20a, 20b. The output signal at 26 is thus a temperature function signal which, at the end of the short term time constants, provides an accurate indication of the step change in temperature and remains constant during the period of the long term time constants. To appreciate the significance of this output, a typical short term time constant is .02 second whereas the long term time constant could be in the order of 100 seconds. Thus, it is possible to obtain from the present system an accurate temperature sensing signal in approximately 1/5000th the time required for either sensor to individualy provide such a signal.

From FIGS. 4 and 5 it will be apparent that to obtain this desired result the short term time constants $C_1$, $C_2$ should be equal; the long term time constants should also be equal; the rate of change of one sensor output should be different from that of the other sensor during the short term time constants; and their rates of change during the long term time constants should be equal.

The time constants and the percentage of signal change during the short term time constant can be established by those skilled in the art to obtain the novel results described above. However, it will be noted that the time constants and the percentage of signal change during the short and long term time constants are an interrelated function of two primary parameters, viz rate of fluid flow and thermal mass. Short term time constants and percentage of signal change therein are more a function of fluid flow rate, while long term time constants are a function of both the thermal mass of the sensor and fluid flow rate.

Recognizing that the long term time constant and short term time constant of such sensors can be varied, as described above, further enables the generation of other temperature function signals not obtainable from a single sensor. One important function output is illustrated in FIGS. 6 and 7, in which the same reference characters are employed to identify like parameters. The sensors 18a, 18b would be modified as to flow rates and thermal mass to obtain the characteristics now to be described.

At the expiration of the short term time constants, the different ($\Delta f_1$) in frequency between outputs 20a, 20b is greater than their initial difference ($\Delta f_0$) and also greater than their difference ($\Delta f_2$) in frequency at the expiration of the long term time constants at a steady state condition. The difference frequency 26 (FIG. 7) provided by the output of the beat detector 22 thus provides a signal, at the expiration of the short term time constants, which indicates a temperature increase greater than actually occurs. However, when the long term time constants run out, the difference frequency again accurately reflects the actual temperature being sensed.

The last described signal output gives a leading relationship which can provide a compensating effect for components which are responsive to the output signal. Thus, for example, it would normally be expected that there would be a delay or time lag between a change in the signal to the transducer 24 and a corresponding change in the reading of indicator 28. By providing a leading relationship to the output of the beat detector 22, this delay or lagging relation can be compensated and thus minimized.

It should be recognized that the plots referenced in FIGS. 4–7 are straight line approximations of actual exponential curves for clarity of description. Further, the description is to instantaneous step change in the temperature of the fluid introduced into the sensors 18a, 18b by way of conduits 16a, 16b. However, the described advantages of being able to minimize response times and/or generate other temperature function signals is equally applicable to varying rates of temperature changes and to temperature decreases as well as increases.

Further, while the described relation of constants and short term signal changes for obtaining an accurate temperature signal in a minimum of time or a temperature function signal having a leading function are preferred, other relationships can be employed with advantage in certain circumstances. For example, the short term time constants do not necessarily have to be equal, nor do the long term time constants. However, it is preferred that they be approximately so.

In any event the use of sensors having a known relationship between their output at the end of their short term time constants and their difference at the end of their long term time constants provides a useful output signal in a much shorter time and of a nature different from that which could be obtained with a single sensor alone. Such an output signal can be employed as a control signal as well as to provide an analogue readout.

The present specification describes a particular type of sensor which not only has accuracy over a broad range of inlet pressures because of the controlled flow therethrough but also can have a minimum response time. It will be apparent, however, that in the broader aspects of the invention there are similar advantages in systems employing other fluidic sensors, as well as other means for deriving a difference signal between the outputs of the two sensors. The temperature sensors need not generate a signal having a frequency proportionate to temperature, but could have some other parameter, such as pressure, and be proportional to the temperature being sensed.

Having thus described the invention, what is claimed is novel and desired to be secured by Letters Patent of the United States is:

1. A fluidic temperature sensing system comprising,
    first and second fluidic sensor means respectively having output signals which are a function of the temperature being sensed and which vary at different rates with changes in temperature,
    said first and second sensor means each having, for a step change in the temperature being sensed, a short term time constant in which there is a given percentage of overall change in the value of the output signal in a relatively short time and a long term constant in which the remainder of the change in output signal value occurs over a substantially longer period of time,
    said second sensor means having at the expiration of its short term time constant a change in value, in its output signal, different from the change in value of the signal of the first sensor means at the expiration of its short term time constant,
    the difference between said sensor means signals at the expiration of the short term time constants having a predetermined relation relative to the difference between the signals at the expiration of the long term time constants, and
    means for deriving a system output signal proportionate to the difference between the sensor signals,
    whereby the system output signal provides a temperature function signal.

2. A fluidic temperature sensing system as in claim 1 wherein,
    the first and second sensor means each have short term and long term time constants of approximately the same value and further wherein,
    said sensors have the same percentage change in the value of their output signals during their short term time constants, relative to the total change in signal caused by the step change in temperature, whereby the difference between the output signals of the two sensor means at the expiration of the short term time constants will be the same as the difference therebetween at the expiration of the long term time constants, and the system ouput signal will provide an accurate temperature indication throughout the duration of the long term time constants.

3. A fluidic temperature sensing system as in claim 1 wherein,
    said first and second sensor means have short term and long term time constants which are of approximately equal duration, and further wherein,
    the sensor means having the higher signal value has a greater percentage change, relative to its total change resulting from the step change in temperature, than the sensor having the lower value, whereby at the expiration of the short term time constants there will be a greater difference between the output signals than at the expiration of the long term time constants, and the system output signal will provide a temperature function with a leading relationship.

4. A fluidic temperature sensing system as in claim 1 wherein,
    each temperature sensing means comprises a sensor element through which a fluid stream, having the temperature to be sensed flows and comprises means for generating the output signal with a frequency of pressure variation, the frequency of which is proportionate to the temperature of the fluid flowing therethrough.

5. A fluidic temperature sensing system as in claim 4 wherein,
    each sensor comprises,
    an inlet nozzle from which the fluid stream is discharged,
    a pair of resonant, longitudinally tubular cavities on opposite sides of the discharge from said nozzle,
    a divider between said cavities, said divider being spaced from said inlet nozzle discharge and disposed symmetrically thereof, whereby the hot gas jet alternately pressurizes first one and then the other of said cavities to generate the pressure varying signal,
    means for venting said cavities, said venting means having an area substantially less than the area of the inlet nozzle.

6. A fluidic temperature sensing system as in claim 5 wherein,
    the first and second sensors each have short term and long term time constants of approximately the same value,
    said sensors have the same percentage change in frequency of their output signals during their short term time constants relative to the total frequency change caused by the step increase in temperature,
    whereby the frequency difference between the output signals of the two sensors at the expiration of the short term time constants will be the same as the difference therebetween at the expiration of the long term constants and the system output signal will provide an accurate temperature indication throughout the duration of the long term time constants.

7. A fluidic temperature sensing systems as in claim 5 wherein, said first and second sensors have short term and long term time constants which are of approximately equal duration and further wherein, the sensor having the higher frequency has a greater percentage change relative to the total frequency change resulting from the step change in temperature than the sensor having the lower frequency, whereby at the expiration of the short term time constants, there will be a greater frequency difference between the output signals than at the expiration of the long term time constants and the system output signal will provide a temperature function with a leading relationship.

References Cited

UNITED STATES PATENTS

| | | | |
|---|---|---|---|
| 3,314,294 | 4/1967 | Colston | 73—357 |
| 3,355,949 | 12/1967 | Elwood et al. | 73—362 |
| 3,501,956 | 3/1970 | Yamaga et al. | 73—339(A) |

FOREIGN PATENTS

| | | | |
|---|---|---|---|
| 1,014,420 | 12/1965 | Great Britain | 73—339(A) |

VERLIN R. PENDEGRASS, Primary Examiner

U.S. Cl. X.R.

73—357